(12) United States Patent
Oji

(10) Patent No.: US 10,328,751 B2
(45) Date of Patent: Jun. 25, 2019

(54) PNEUMATIC TIRE

(71) Applicant: SUMITOMO RUBBER INDUSTRIES LTD., Kobe-shi, Hyogo (JP)

(72) Inventor: Takuya Oji, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 726 days.

(21) Appl. No.: 14/845,537

(22) Filed: Sep. 4, 2015

(65) Prior Publication Data

US 2016/0089939 A1 Mar. 31, 2016

(30) Foreign Application Priority Data

Sep. 25, 2014 (JP) .................................. 2014-195622

(51) Int. Cl.
*B60C 11/11* (2006.01)
*B60C 11/04* (2006.01)
(Continued)

(52) U.S. Cl.
CPC ................ *B60C 11/04* (2013.01); *B60C 5/12* (2013.01); *B60C 11/11* (2013.01);
(Continued)

(58) Field of Classification Search
CPC ............ B60C 11/11; B60C 2011/0346; B60C 2011/0365; B60C 2011/0372
See application file for complete search history.

(56) References Cited

U.S. PATENT DOCUMENTS 4,784,200 A * 11/1988 Fujiwara ................. B60C 11/00
152/209.18
6,102,093 A * 8/2000 Nakagawa .............. B60C 11/11
152/209.18
(Continued)

FOREIGN PATENT DOCUMENTS

EP 1176034 A2 1/2002
EP 2163404 A1 3/2010
(Continued)

OTHER PUBLICATIONS

Machine translation for Japan 2013-139164 (Year: 2018).*
Extended European Search Report, for European Application No. 15184156.6, dated Feb. 23, 2016.

*Primary Examiner* — Steven D Maki
(74) *Attorney, Agent, or Firm* — Birch, Stewart, Kolasch & Birch LLP

(57) ABSTRACT

A pneumatic tire includes a tread portion provided with a circumferentially and continuously extending zigzag shoulder main groove located adjacent to a tread edge, a shoulder lateral groove extending axially outwardly from the shoulder main groove and a central lateral groove extending axially inwardly from the shoulder main groove. The shoulder main groove includes an inner corner portion protruding axially inwardly. The central lateral groove includes a first groove portion, a second groove portion and a confluence portion at which the first groove portion and the second groove portion meet. The confluence portion of the central lateral groove is communicated with the inner corner portion of the shoulder main groove. The shoulder lateral groove is located so that an extended portion in which the shoulder lateral groove is extended axially inwardly overlaps with the confluence portion at least partially.

3 Claims, 10 Drawing Sheets

(51) Int. Cl.
  *B60C 5/12* (2006.01)
  *B60C 11/03* (2006.01)
(52) U.S. Cl.
  CPC .......... *B60C 2011/0346* (2013.01); *B60C 2011/0365* (2013.01); *B60C 2011/0372* (2013.01); *B60C 2011/0381* (2013.01)

(56) References Cited

U.S. PATENT DOCUMENTS

| | | | | |
|---|---|---|---|---|
| 2010/0059157 | A1* | 3/2010 | Ashton | B60C 11/0311 152/209.16 |
| 2012/0267022 | A1* | 10/2012 | Tagashira | B60C 11/0309 152/209.25 |
| 2016/0121659 | A1* | 5/2016 | Kageyama | B60C 11/1384 152/209.24 |
| 2016/0193881 | A1* | 7/2016 | Nakayama | B60C 11/0309 152/209.15 |

FOREIGN PATENT DOCUMENTS

| | | | |
|---|---|---|---|
| EP | 2433817 | A2 | 3/2012 |
| JP | 2012-224245 | A | 11/2012 |
| JP | 2013-139164 | A * | 7/2013 |

\* cited by examiner

PNEUMATIC TIRE

BACKGROUND OF THE INVENTION

Field of the Invention

The present invention relates to pneumatic tires, and in particular, relates to a pneumatic tire that may exhibit in excellent on-snow performance.

Description of the Related Art

Japanese Unexamined Patent Application Publication No. 2012-224245 discloses a pneumatic tire that includes a tread portion provided with a middle lateral groove having a specific inclined angle and a depth. The pneumatic tire is expected improved steering stability and on-snow performance by generating high snow shearing force while ensuring tread block rigidity.

Unfortunately, since the middle lateral groove of the pneumatic tire as mentioned above is communicated with a middle portion of a zigzag shoulder main groove which is between inner and outer corners, snow to be introduced into the shoulder main groove and the middle lateral groove may not be compressed sufficiently during traveling. Accordingly, there is room for improvement on the pneumatic tire with respect to on-snow performance.

SUMMARY OF THE INVENTION

In view of the above problems in the conventional art, the present invention has an object to provide a pneumatic tire that may exhibit in excellent on-snow performance.

According to one aspect of the invention, a pneumatic tire includes a tread portion provided with a circumferentially and continuously extending zigzag shoulder main groove located adjacent to a tread edge, a shoulder lateral groove extending axially outwardly from the shoulder main groove and a central lateral groove extending axially inwardly from the shoulder main groove. The shoulder main groove includes an inner corner portion protruding axially inwardly. The central lateral groove includes a first groove portion, a second groove portion and a confluence portion at which the first groove portion and the second groove portion meet. The confluence portion of the central lateral groove is communicated with the inner corner portion of the shoulder main groove. The shoulder lateral groove is located so that an extended portion in which the shoulder lateral groove is extended axially inwardly overlaps with the confluence portion at least partially.

In another aspect of the invention, the shoulder main groove may include an axially outer groove edge comprising an inner corner protruding axially inwardly, and the shoulder lateral groove may be communicated with the shoulder main groove at a location except the inner corner.

In another aspect of the invention, the confluence portion has a groove width in a circumferential direction of the tire, and the extended portion may overlap with the confluence portion in a width not more than a half of the width of the confluence portion.

In another aspect of the invention, the shoulder lateral groove may include an inner portion extending from the shoulder main groove and an outer portion extending from the inner portion and having a width larger than that of the inner portion.

In another aspect of the invention, the inner portion has an angle with respect to an axial direction of the tire different from that of the outer portion, and the difference in angles between the inner portion and the outer portion may be in a range of from 5 to 10 degrees.

In another aspect of the invention, an axial distance from a tire equator to a center line of the shoulder main groove may be in a range of from 0.4 to 0.6 times a tread half width which is an axial distance from the tire equator to the tread edge.

DESCRIPTION OF THE EMBODIMENTS

Figure 1:
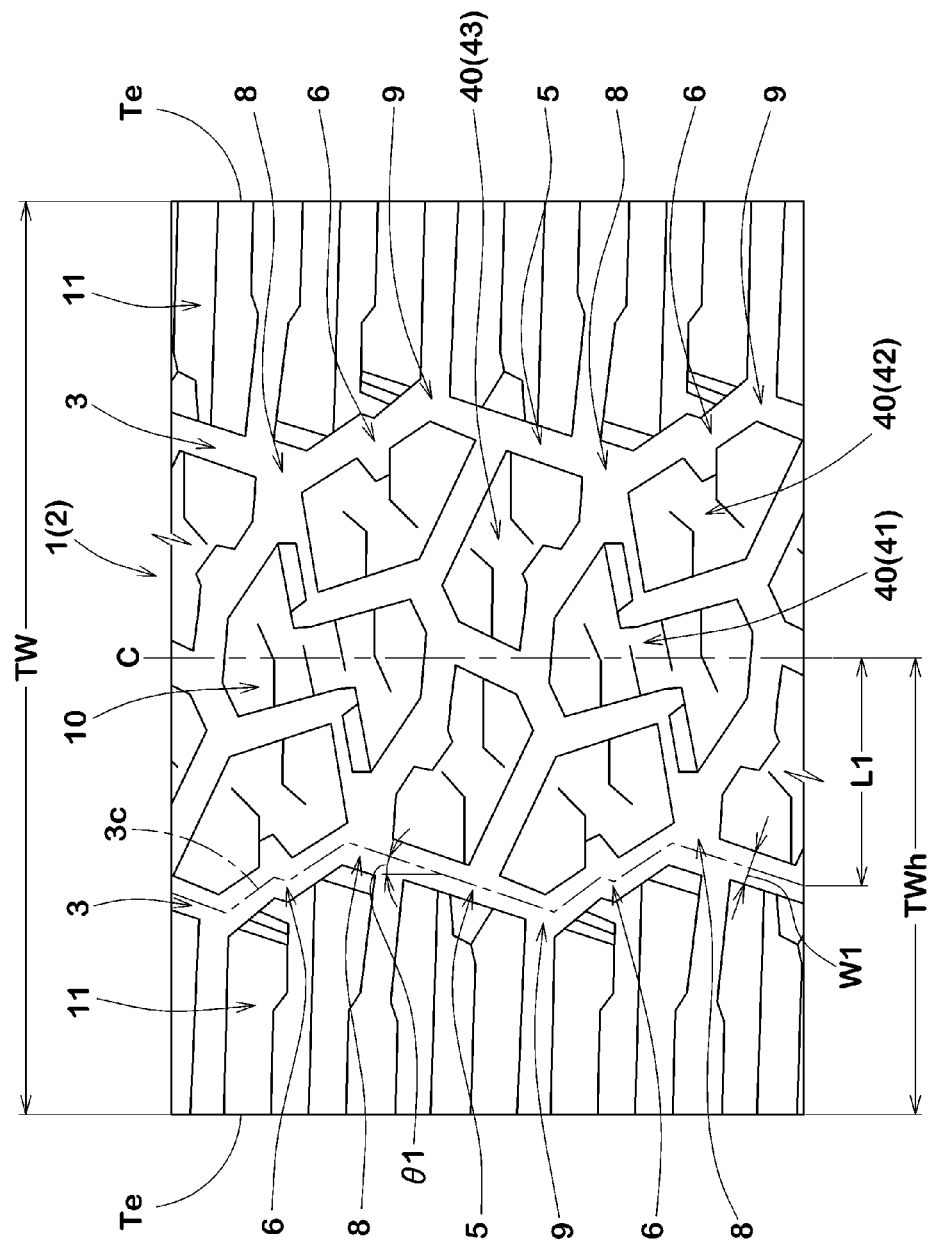
FIG. 1 is a development view of a tread portion of a pneumatic tire in accordance with an embodiment of the present invention.

An embodiment of the present invention will be explained below with reference to the accompanying drawings. It should be noted that like elements are denoted by the same reference numerals throughout the disclosure.

FIG. 1 illustrates a tread portion 2 of a pneumatic tire 1 in accordance with an embodiment of the present invention. The pneumatic tire 1, for example, may preferably be embodied for SUV that suitably travel on a rough terrain.

As shown in FIG. 1, the tread portion 2 of the tire 1 is provided with a pair of shoulder main grooves 3 and 3.

Each shoulder main groove 3 extends in a zigzag manner in a circumferential direction of the tire and is located adjacent to a tread edge Te.

In each side of the tire equator C, the tread edge Te refers to an axially outermost edge of the ground contacting patch of the tread portion 2 which occurs under a normally inflated loaded condition when the camber angle of the tire is zero. The normally inflated loaded condition is such that the tire 1 is mounted on a standard wheel rim with a standard pressure and loaded with a standard tire load.

The standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

The standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

The standard tire load is a tire load officially approved or recommended for the tire by standards organizations, wherein the standard load is the "maximum load capacity" in JATMA, the "Load Capacity" in ETRTO, and the maximum value given in the above-mentioned table in TRA or the like.

In this application including specification and claims, various dimensions, positions and the like of the tire refer to those under a normally inflated unloaded condition of the tire unless otherwise noted. The normally inflated unloaded condition is such that the tire 1 is mounted on the standard wheel rim with the standard pressure but loaded with no tire load. The tread width TW is defined as the width measured under the normally inflated unloaded condition, as the axial distance between the tread edges Te and Te.

The shoulder main groove 3, for example, includes a first inclined element 5 inclined at an angle with respect to the circumferential direction of the tire and a second inclined element 6 inclined in an opposite direction to the first inclined element 5. The first inclined element 5 and the second inclined element 6 are arranged alternately in the circumferential direction of the tire. In this embodiment, the second inclined element 6 has a circumferential length smaller than that of the first inclined element 5.

The shoulder main groove 3 includes a plurality of inner corner portions 8 each protruding axially inwardly and a plurality of outer corner portions 9 each protruding axially outwardly. These inner corner portions 8 and outer corner portions 9 are formed alternately in the circumferential direction of the tire.

The first inclined element 5 and the second inclined element 6 have an angle θ1 in a range of from 5 to 25 degrees, more preferably in a range of from 10 to 20 degrees with respect to the circumferential direction of the tire, for example. Such first and second inclined elements 5 and 6 may improve traction on icy or snowy road.

The shoulder main groove 3, for example, has a width W1 in a range of from 2.5% to 5.0% of the tread width TW in order to ensure not only steering stability on dry road but also wet performance.

The shoulder main groove 3 preferably has a depth in a range of from 5 to 15 mm as the SUV tire, for example.

When the shoulder main groove 3 comes into contact with a road, it may be compressed in the longitudinal direction due to compressive deformation of the tread portion 2. Accordingly, when the tire travels on snow road, snow to be introduced into the shoulder main groove 3 may strongly be compressed by at the respective inner and outer corner portions 8 and 9 so as to be formed as a hard snow column.

In order to further improve the advantageous effect above, an axial distance L1 from the tire equator C to the center line 3c of the shoulder main groove 3 is preferably set in a range of from 0.4 to 0.6 times a tread half width TWh which is an axial distance from the tire equator C to one of the tread edges Te. Namely, the axial distance L1 may vary in the above range in the circumferential direction of the tire.

The tread portion 2 further includes a central portion 10 defined between the pair of shoulder main grooves 3 and a pair of shoulder portions 11 each located axially outward of the central portion 10.

Figure 2:
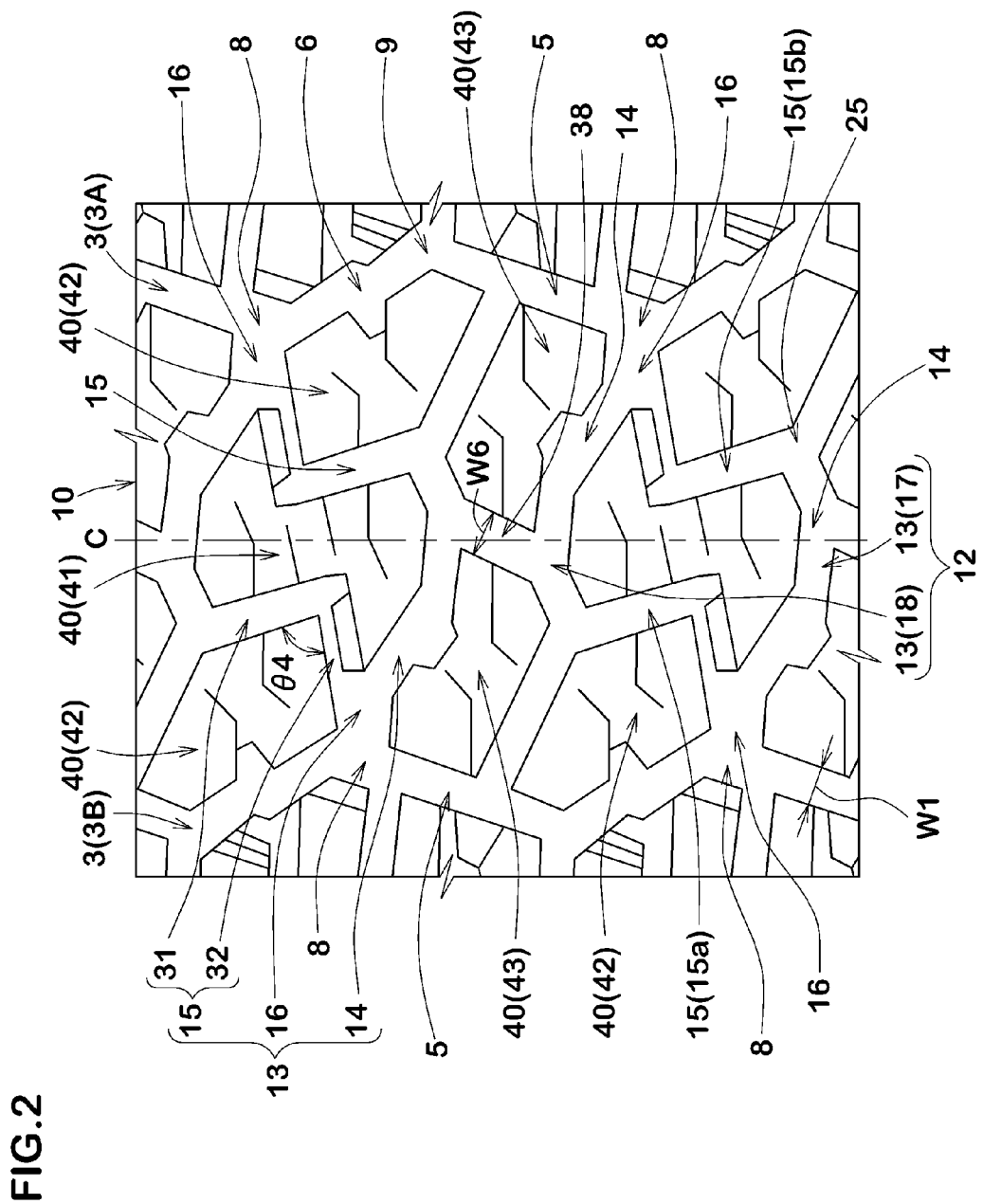
FIG. 2 is an enlarged view of a central portion illustrated in FIG. 1.

FIG. 2 illustrates an enlarged view of the central portion 10. The central portion 10 is provided with a plurality of central lateral grooves 13 that are arranged in the circumferential direction of the tire apart from one another.

Figure 3:
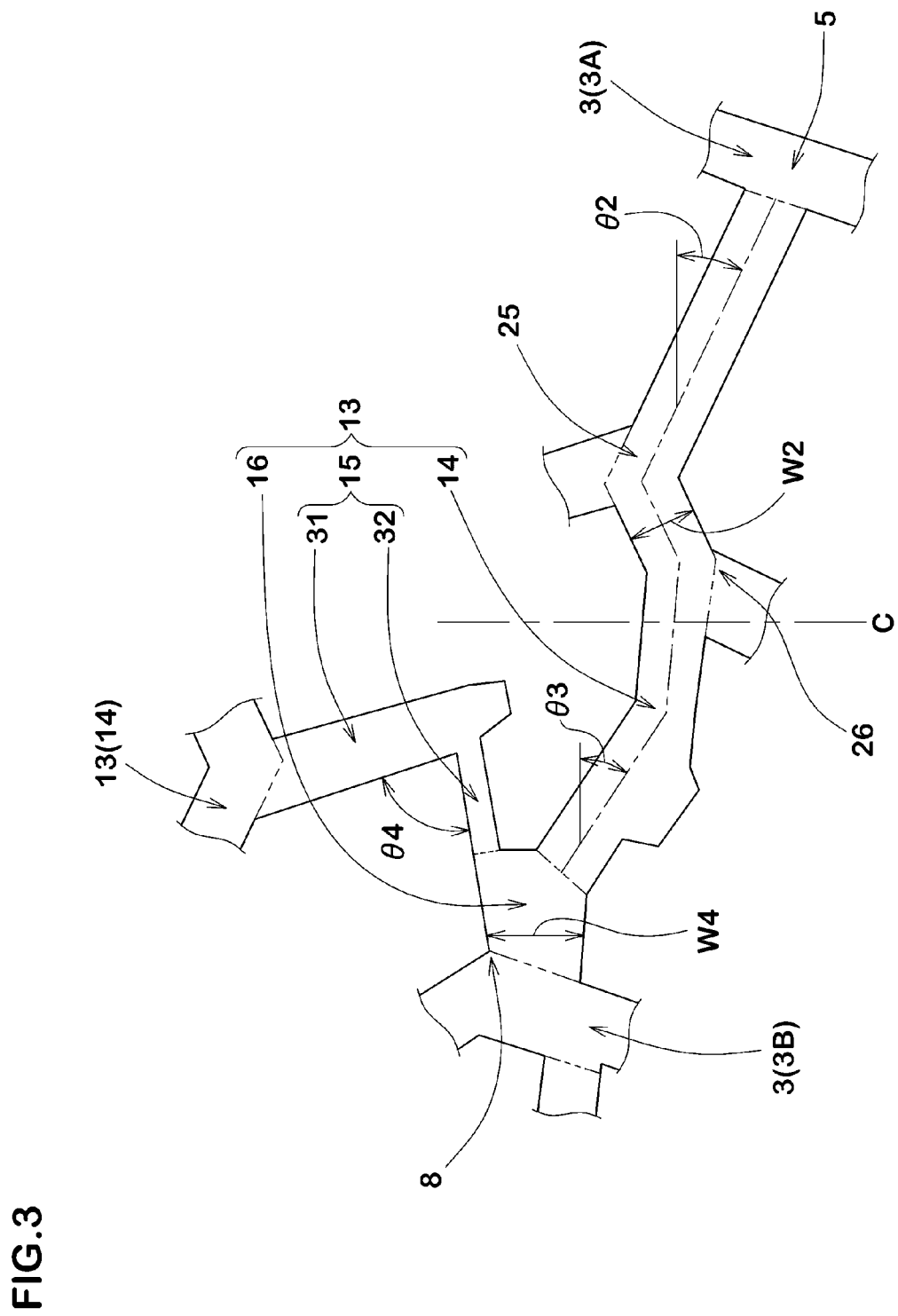
FIG. 3 is an enlarged view of a central lateral groove illustrated in FIG. 2.

FIG. 3 is an enlarged view of the central lateral groove 13. As shown in FIG. 3, each central lateral groove 13 includes a first groove portion 14, a second groove portion 15 and a confluence portion 16 at which the first groove portion 14 and the second groove portion 15 meet.

In a section shown in FIG. 3, the first groove portion 14, for example, extends from the right side shoulder main groove 3A toward the left side shoulder main groove 3B. The first groove portion 14, for example, is communicated with the shoulder main groove 3A at a location except the inner and outer corner portions 8 and 9 (shown in FIG. 1). In this embodiment, the first groove portion 14 extends from the first inclined element 5 of the shoulder main groove 3A to the shoulder main groove 3B through the confluence portion 16.

The first groove portion 14, for example, includes a plurality of corners including an upward protruding corner 25 and a downward protruding corner 26 in FIG. 3. Thus, the first groove portion 14 extends in an S-shaped manner. According to deformation of the tread portion in the axial direction when cornering on snowy road, such a first groove portion 14 may sufficiently compress snow to be introduced therein.

The first groove portion 14 may be inclined at an angle with respect to the axial direction of the tire, for example. Preferably, the angle θ2 of the first groove portion 14 with respect to the axial direction of the tire is in a range of from 0 to 45 degrees. Preferably, the first groove portion 14 is communicated with the confluence portion 16 at an angle θ3 in a range of from 30 to 45 degrees with respect to the axial direction of the tire.

Preferably, the first groove portion 14 has a width W2 which is 0.8 to 1.2 times the width W1 (shown in FIG. 1) of the shoulder main groove 3 in order to improve steering stability on dry road and on-snow performance in a well balanced manner.

The second groove portion 15 includes a first element 31 and a second element 32 which are connected so as to form an angle protruding axially inwardly.

The second element 32 of the second groove portion 15 extends axially inwardly from the confluence portion 16 apart from the first groove portion 14. The first element 31 circumferentially extends axially outwardly from an axially inner end of the second element 32 to the other one of the first groove portions 14. In this embodiment, the first element 31 is inclined at angle with respect to the circumferential direction of the tire. The second element 32 has a width smaller than that of the first element 31, for example. Furthermore, the second element 32 has an angle θ4 in a range of from 80 to 90 degrees with respect to the first element 31.

Each confluence portion 16 is communicated with each inner corner portion 8 of the shoulder main groove 3. The confluence portion 16, for example, is configured as a small part of groove having a pair of groove edges extending in the axial direction of the tire. Each groove edge of the confluence portion 16 is connected to a groove edge of either one of the first groove portion 14 or the second groove portion 15. In this embodiment, the confluence portion 16 has a circumferential width W4 greater than the width W1 of the shoulder main groove 3. Preferably, the width W4 of the confluence portion 16 is in a range of from 1.1 to 1.4 times the width W1 of the shoulder main groove 3.

Generally, since a tread land portion located close to the tire equator is subjected to a large ground contacting pressure, snow compressed by the tread portion 2 tends to be pushed away axially outwardly when traveling on snowy road. Thus, the snow compressed by each of the first groove portion 14 and the second groove portion 15 of the central lateral groove 13 tends to be pushed toward the confluence portion 16. While, the shoulder main groove 3, as described above, may strongly compress snow at around the respective inner corner portions 8. Accordingly, the tread pattern in accordance with the present invention may provide a hard snow pillar in both of the inner corner portions 8 and the confluence portions 16 which are joined one another, and then generate a large traction by shearing it, thereby resulting in an excellent on-snow performance.

As shown in FIG. 2, the central lateral grooves 13 include a first central lateral groove 17 having the outline shown in FIG. 3 and a second central lateral groove 18 having a point symmetrical outline of the first central lateral groove 17 with respect to a point on the tire equator C. The first central lateral groove 17 and the second central lateral groove 18 are arranged alternately in the circumferential direction of the tire.

The second groove portion 15a of the first central lateral groove 17 is communicated with the first groove portion 14 of the second central lateral groove 18 adjacent upward of the concerned first central lateral groove 17.

Similarly, the second groove portion 15b of the second central lateral groove 18 is communicated with the first groove portion 14b of the first central lateral groove 17 adjacent downward of the concerned second central groove 18.

In this embodiment, a plurality of sets 12 of central lateral grooves which include the first central lateral groove 17 and the second central lateral groove 18 communicated with each other are arranged in the circumferential direction of the tire.

In this embodiment, a connecting groove 38 is arranged between circumferentially adjacent sets 12 of central lateral grooves. The connecting groove 38 extends on or near the tire equator C, for example. Preferably, the connecting groove 38 has a width W6 greater than that of the shoulder main groove 3. More preferably, the width W6 of the connecting groove 38 is in a range of from 1.1 to 1.4 times, still further preferably in a range of from 1.2 to 1.3 times the width W1 of the shoulder main groove 3. Such a connecting groove 38 may be useful to improve wet performance and on-snow performance.

The central portion 10 is separated into a plurality of central blocks 40 by the central lateral grooves 13 and the connecting grooves 38. The central blocks 40 include a first central block 41, a second central block 42 and a third central block 43.

The first central block 41 is arranged on the tire equator C separated by the first groove portions 14 and the second groove portions 15 between circumferentially adjacent central lateral grooves 13.

Figure 4:
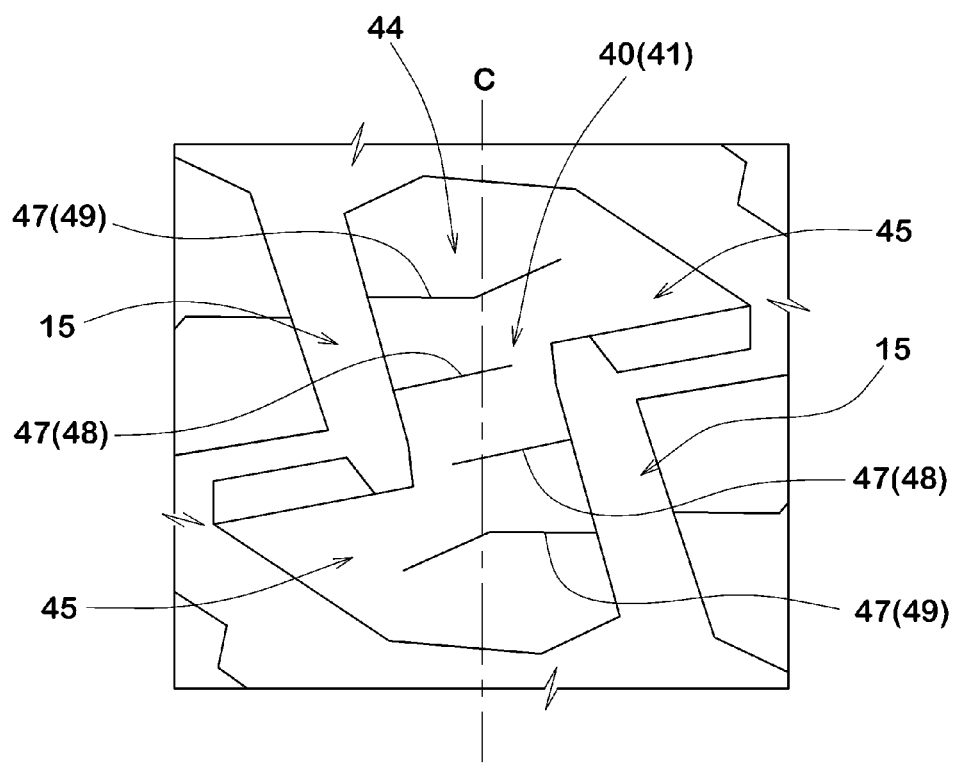
FIG. 4 is an enlarged view of a first central block illustrated in FIG. 2.

FIG. 4 illustrates an enlarged view of the first central block 41. As shown in FIG. 4, the first central block 41 includes a main portion 44 extending in the circumferential direction of the tire on the tire equator C and a pair of protrusive portions 45 each protruding in an axially opposite side from the main portion 44 at circumferential both ends of the main portion 44. Furthermore, each protrusive portion 45 is arranged in a point symmetrical place with respect to a point on the tire equator C. Such a first central block 41 may generate friction force in various directions by using its top surface edges to improve wet performance and on-ice performance.

The first central block 41 is provided with a plurality of first sipes 47 each of which extends from at least one of the second groove portions 15 and terminates within the block. In this embodiment, at least one of the first sipes 47 includes, for example, a straightly extending sipe 48 and a bent sipe 49, which are useful to improve edge effect of the first central block 41.

As shown in FIG. 2, the second central blocks 42 is arranged on axially both sides of the first central block 41. Each second central block 42 is arranged in a point symmetrical with respect to a point on the tire equator C. The second central block 42 is surrounded by one of the shoulder main grooves 3, one of the second groove portions 15 and one of the first groove portions 14 of the central lateral grooves 13.

Figure 5:
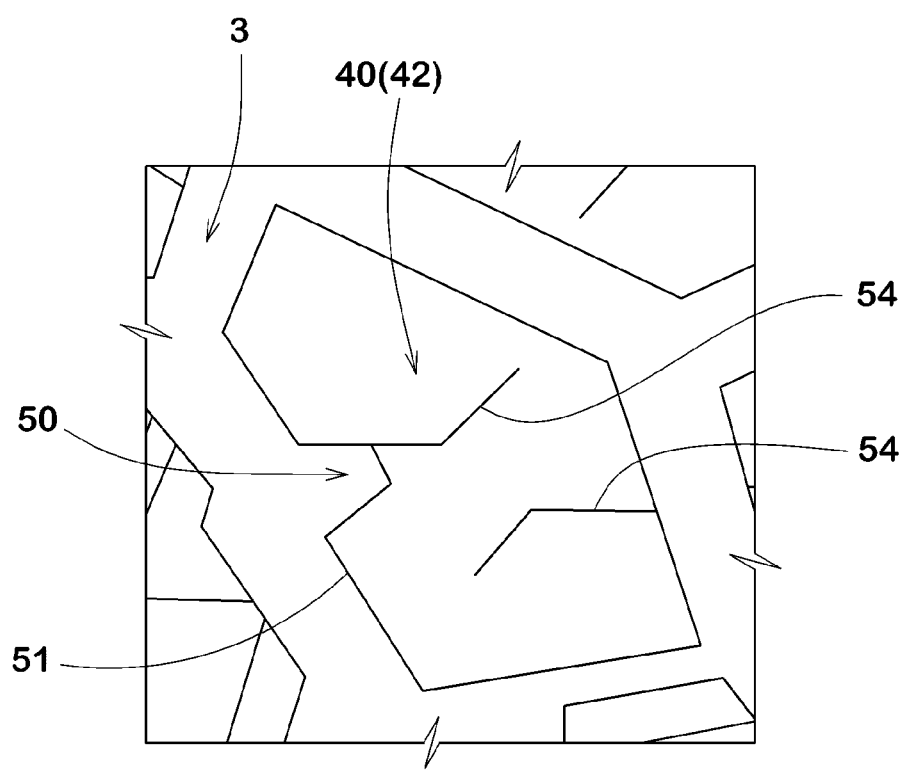
FIG. 5 is an enlarged view of a second central block illustrated in FIG. 2.

FIG. 5 illustrates an enlarged view of the second central block 42. As shown in FIG. 5, the second central block 42 is provided with a dent portion 50 on its axially outer edge 51. The second central block 42 has a top surface having a substantially pentagon shape except the dent portion 50.

Preferably, the dent portion 50 has a width in a direction along the axially outer edge 51 and which reduces toward axially inwardly. The dent portion 50 may be useful to compress the snow to be introduced therein to form a hard snow pillar on snowy road and shear it to generate large traction on snowy road.

The second central block 42 is provided with at least one second sipe 54 which extends from one of the grooves and terminates within the block. Preferably, the second sipe 54 includes at least one extending from the dent portion 50. More preferably, the second sipe 54 may be bent on its halfway. The second sipe 54 may also improve edge effect of the second central block 42.

As shown in FIG. 2, the pair of third central blocks 43 is provided so as to be located on both sides of the tire equator C between circumferentially adjacent sets 12 of central lateral grooves. Each of the third central blocks 43, for example, is arranged substantially in a point symmetrically with respect to a point on the tire equator C. The third central block 43, for example, is separated by one of the shoulder main grooves 3, circumferentially adjacent central lateral grooves 13 and 13, and one of the connecting grooves 38.

Figure 6:
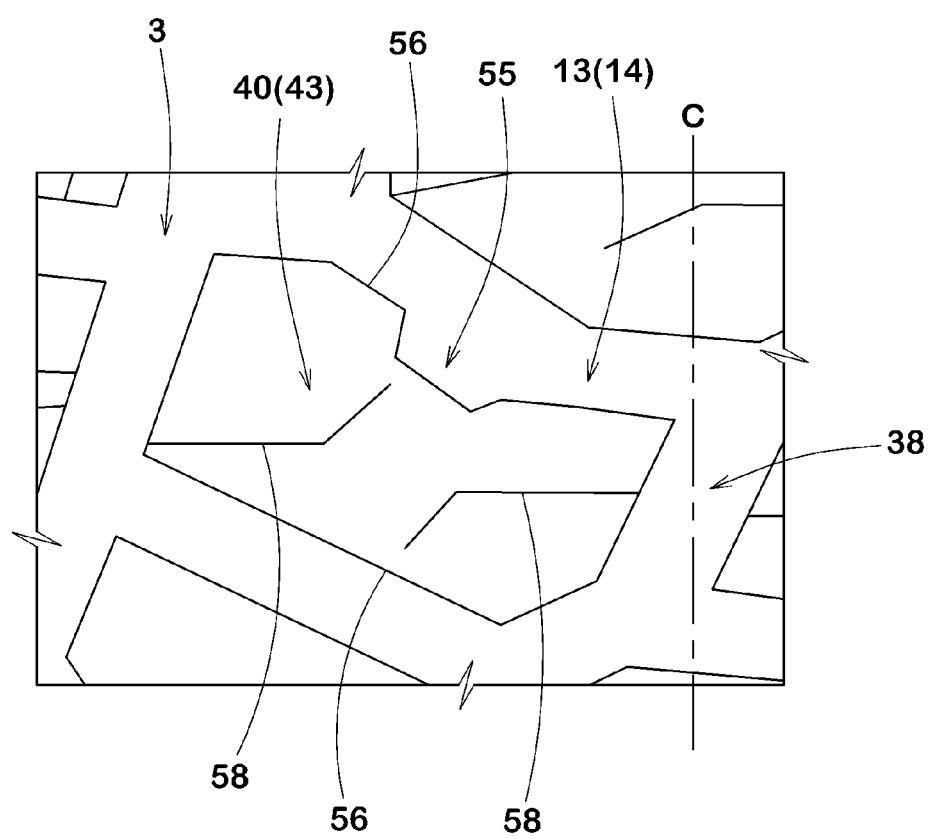
FIG. 6 is an enlarged view of a third central block illustrated in FIG. 2.

FIG. 6 illustrates an enlarged view of the third central block 43. As shown in FIG. 6, the third central block 43 includes a top surface with a pair of axially extending edges 56 and 56. In this embodiment, at least one of the edges 56 includes a dent portion 55 dented toward the center of the block. Preferably, the dent portion 55 of the third central block 43 has a width reducing gradually toward the center of the block. Such a dent portion 55 may be useful to ensure large traction on snowy road.

The third central block 43 is provided with at least one third sipe 58 extending from either one of the shoulder main grooves 3 or the connecting groove 38 and terminates within the block. Preferably, the third sipe 58 may be bent on its halfway. The third central block 43 with the third sipe 58 may improve advantageous edge effect while ensuring block rigidity, thereby improving steering stability on dry road as well as on-snow performance in a well balanced manner.

Figure 7:
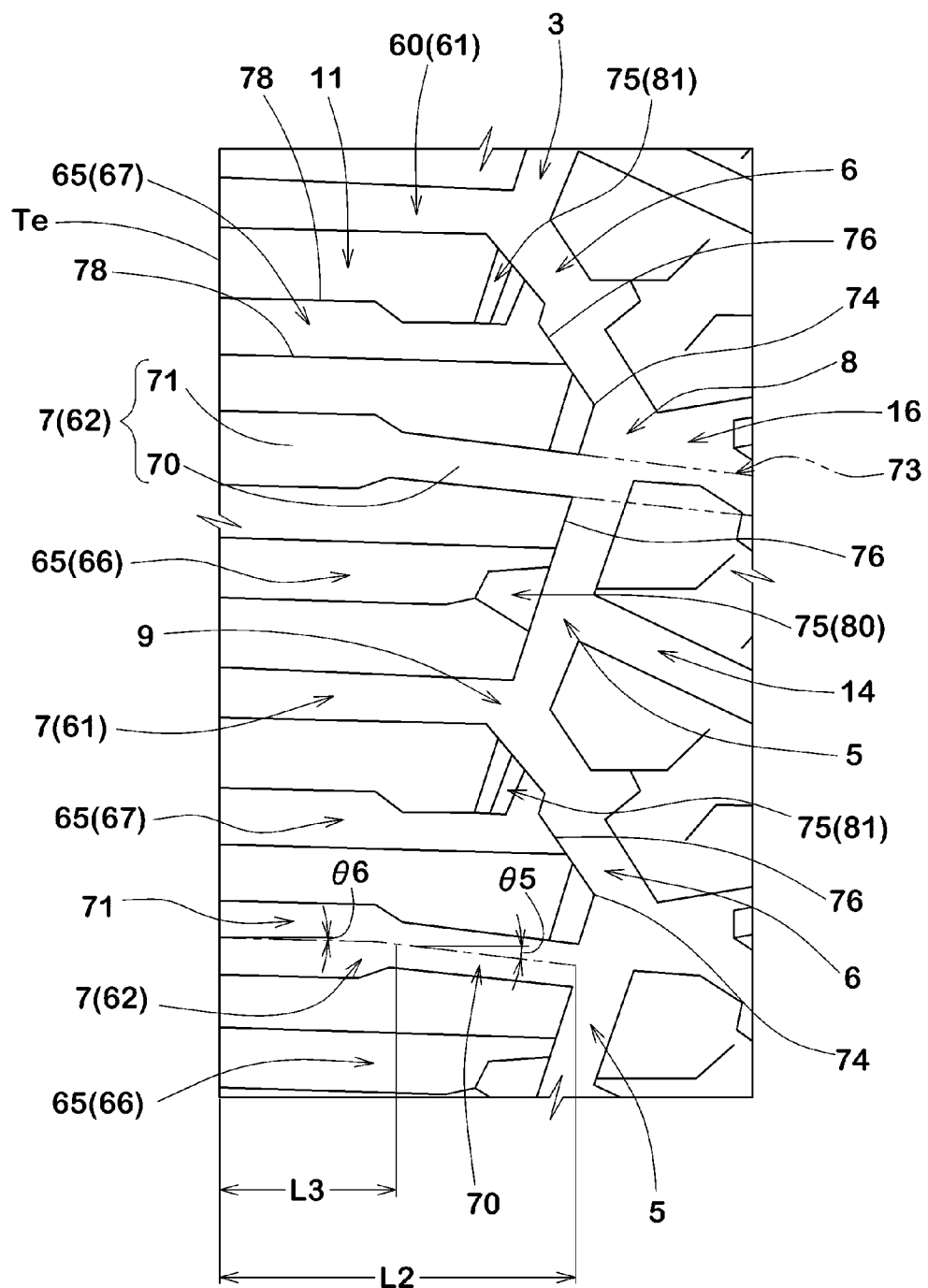
FIG. 7 is an enlarged view of a shoulder portion.

FIG. 7 illustrates an enlarged view of the shoulder portion 11. As shown in FIG. 7, the shoulder portion 11 is provided with a plurality of shoulder lateral grooves 7 each extending from the shoulder main groove 3 to the tread edge Te so as to define a plurality of shoulder blocks 65.

The shoulder lateral grooves 7 include a first shoulder lateral groove 61 communicated with one of the outer corner portions 9 of the shoulder main groove 3 and a second shoulder lateral groove 62 communicated with the first inclined element 5 of the shoulder main groove 3, which are alternately arranged in the circumferential direction of the tire.

In this embodiment, each first shoulder lateral groove 61 extends in a straight manner with a constant width.

Preferably, the second shoulder lateral groove 62 is located so that an extended portion 73 in which the second shoulder lateral groove 62 is extended axially inwardly along its extending direction overlaps with the confluence portion 16 at least partially. Such a second shoulder lateral groove 62 may further compress the snow pillar formed in the inner corner portion 8 and the confluence portion 16 by pushing snow thereto, and then generates a large traction by shearing it.

In order to further improve the advantageous effect while preventing uneven wear from the portion around the inner corner portion 8 and the confluence portion 16, the extended portion 73 preferably overlaps with the confluence portion 16 in a width not more than a half of the width of the confluence portion 16.

Preferably, the second shoulder lateral groove 62, for example, is communicated with the shoulder main groove 3 at a location except the inner corner 74 of the axially outer groove edge of the shoulder main groove 3. According to such a structure, the inner corner 74 on the axially outer groove edge of the shoulder main groove 3 may cut a water film on road and guide either one of the shoulder main groove 3 or the shoulder lateral groove 7, thereby improving wet performance of the tire.

The second shoulder lateral groove 62 includes an axially inner portion 70 connected to the shoulder main groove 3 and an axially outer portion 71 having a width larger than that of the inner portion 70. Such a second shoulder lateral groove 62 may improve wet performance as well as wandering performance.

Preferably, the inner portion 70 has an angle θ5 with respect to the axial direction of the tire, and the angle θ5 is different from an angle θ6 of the outer portion 71. Generally, when the tread portion 2 comes into contact with the road, the air compressed between the road and the shoulder lateral grooves 7 is pushed axially outwardly and makes air-pumping noise. Since the configuration of the inner and outer portions 70 and 71 described above lowers the velocity of the air through the shoulder lateral groove 7, the air-pumping noise may be reduced.

The inner portion 70, for example, has an angle θ5 in a range of from 5 to 15 degrees with respect to the axial direction of the tire. The outer portion 71, for example, has the angle θ6 in a range of from 0 to 5 degrees with respect to the axial direction of the tire. Preferably, the difference between angles θ5 and θ6 is in a range of from 5 to 10 degrees in order to further improve the advantageous effect described above while ensuring wet performance.

In order to further improve wet performance and wandering performance of the tire, the axial length L3 of the outer portion 71 is preferably in a range of not less than 0.50 times, more preferably not less than 0.55 times, but preferably not more than 0.65 times, more preferably not more than 0.60 times the axial length L2 of the second shoulder lateral groove 62.

Each shoulder block 65 has a top surface having a trapezoid-like shape. At least one of the shoulder blocks 65, for example, is provided with a dent portion 75 dented toward the center of the block at its axially inner edge 76. The shoulder block 65 with the dent portion 75 may be useful to ensure large traction on snowy road.

In this embodiment, the shoulder block 65 is further provided with at least one shoulder sipe 78 extending from either one of the shoulder main groove 3 or the dent portion 75. The shoulder sipe 78 may improve uneven wear resistance of the shoulder block 65.

In this embodiment, the shoulder blocks 65 include a first shoulder block 66 and a second shoulder block 67 which are arranged alternately in the circumferential direction of the tire.

The first shoulder block 66 is surrounded by the first shoulder lateral groove 61, the second shoulder lateral groove 62 and the first inclined element 5 of the shoulder main groove 3. The second shoulder block 67 is surrounded by the first shoulder lateral groove 61, the second shoulder lateral groove 62, the second inclined element 6 of the shoulder main groove 3 and a part of the first inclined element 5 of the shoulder main groove 3.

In this embodiment, the dent portions 75 include at least one first dent portion 80 on the first shoulder block 66, and the first dent portion 80 is preferably arranged so as to face the first groove portion 14 through the first inclined element 5. Such a first dent portion 80 may form a large snow pillar by cooperating the first inclined element 5 and the first groove portion 14, thereby increasing traction on snowy road.

Furthermore, the dent portions 75 include at least one second dent portion 81 on the second shoulder block 67, and the second dent portion 81 is preferably located at a position such that the second dent portion 81 and the first inclined element 5 of the shoulder main groove form a straight groove through the second inclined element 6. Such a second dent portion 81 may compress snow strongly which was pushed and moved thereto by the first inclined element 5 of the shoulder main groove 3.

Figure 8:
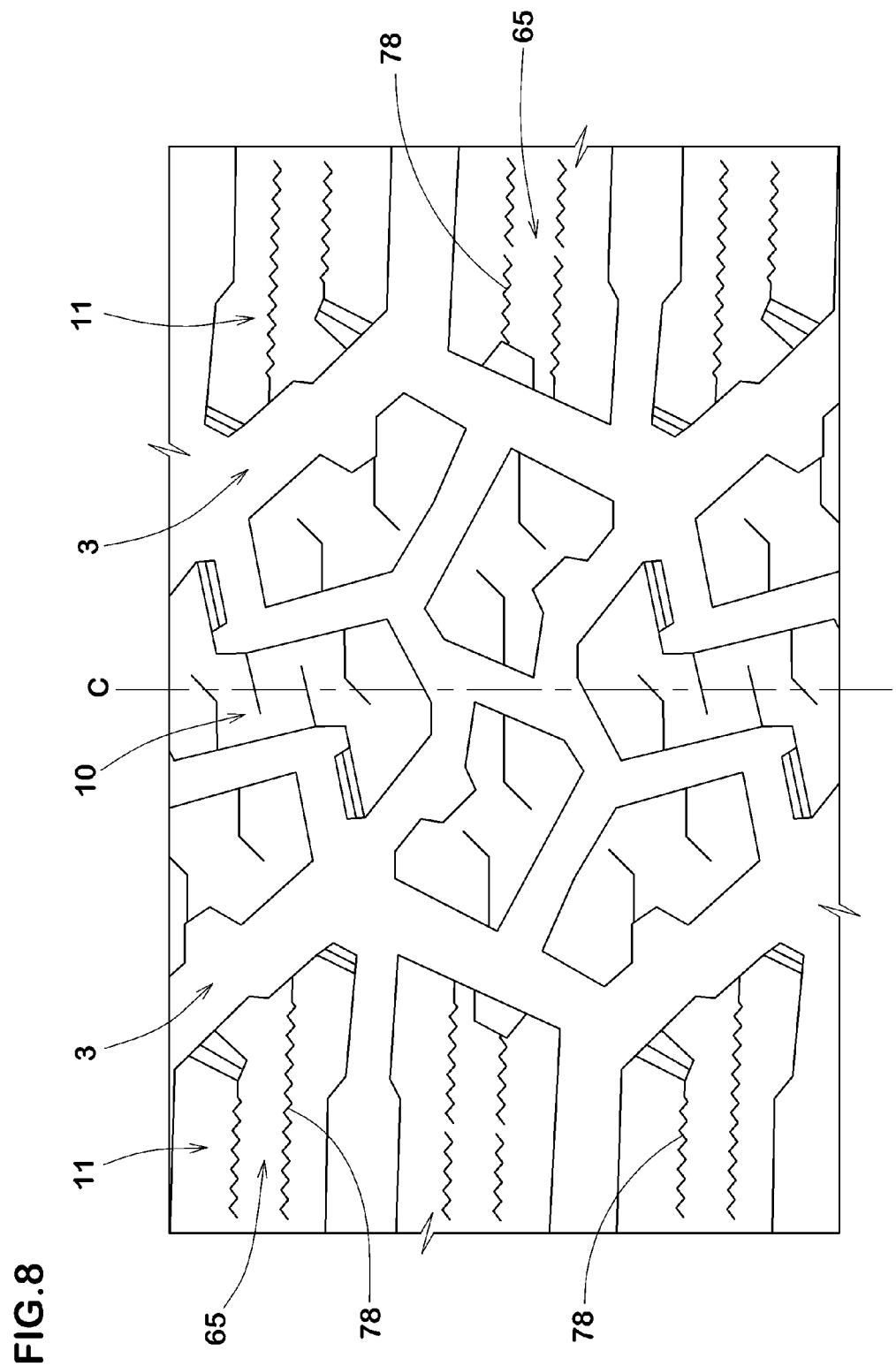
FIG. 8 is a development view of a tread portion in accordance with another embodiment of the present invention.
Figure 9:
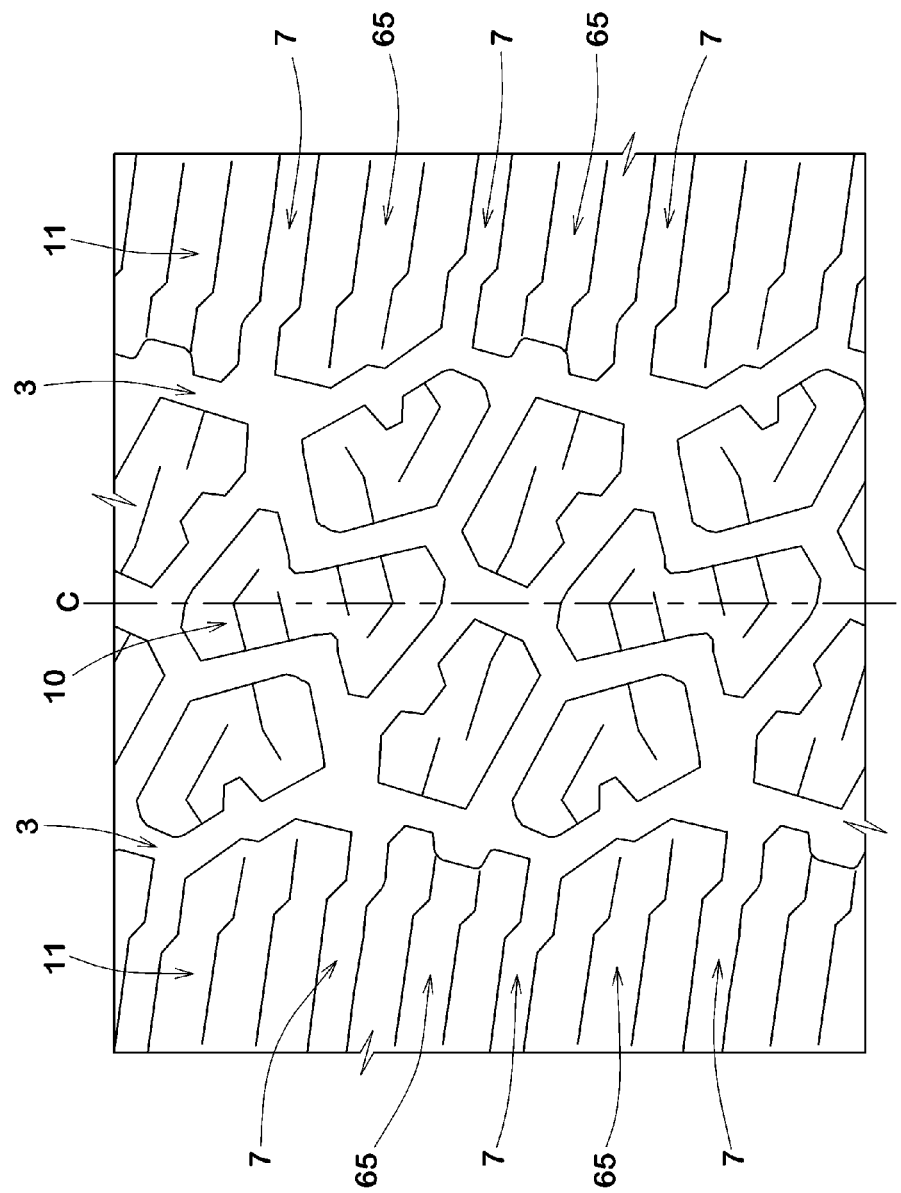
FIG. 9 is a development view of a tread portion in accordance with another embodiment of the present invention.

FIGS. 8 and 9 illustrate enlarged development views of tread portions in accordance with other embodiments of the present invention. In the embodiment shown in FIG. 8, the shoulder sipe 78 extends in a zigzag manner in order to ensure rigidity of shoulder blocks 65, thereby improving steering stability on dry road. In the embodiment shown in FIG. 9, the shoulder blocks include at least one shoulder block 65 that has no dent portion. In this embodiment, the shoulder lateral grooves 7 extend in a crank shape to reduce the air-pumping noise to be generated therefrom.

Figure 10:
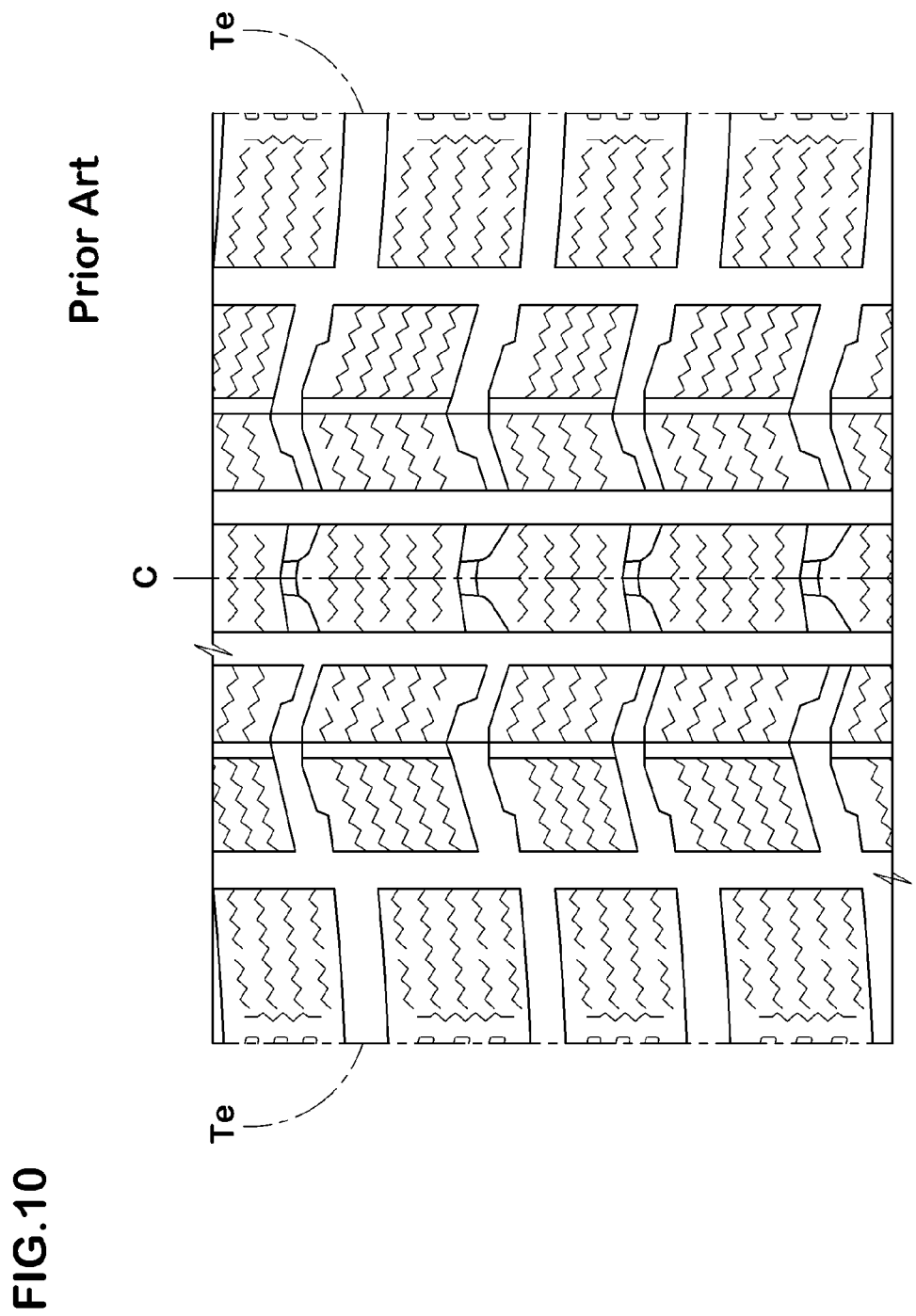
FIG. 10 is a development view of a tread portion in accordance with reference.

The present invention is more specifically described and explained by means of the following Examples and References. It is to be understood that the present invention is not limited to these Examples and embodiments described above Comparison Test:

Pneumatic tires for SUV having a size of 265/70R17 and the tread pattern shown in FIG. 1 and Table 1 were manufactured. As Ref.1, a tire having a tread pattern which includes a straightly extending shoulder main groove and shoulder lateral grooves whose extended portions do not overlap the respective central lateral grooves, as shown in FIG. 10. Then, each tire was tested with respect to on-snow performance, noise performance and wear resistance performance. Major common specifics of the tires and test methods are as follows.

Spec.:
  Rim: 17×7.5
  Internal pressure: 220 kPa
  Test vehicle: Four-wheel drive vehicle of 2,400 cc displacement
  Location of test tire: All wheels On-Snow Performance Test:
  Traveling performance on snowy road of the test vehicle was evaluated by a professional driver based on his feeling. The test results are shown using a score based on Ref. 1 being 100. The larger the value, the better the performance is.

Noise performance test:

The foregoing test vehicle was run at a speed of 100 km/h on a road noise measurement road (rough asphalt road surface), and in-vehicle noise was picked up through a microphone installed near the driver's ear on the window side, and then a sound pressure level of a peak value of air column resonance was measured around a narrow band of 240 Hz. The test results are shown as respective reciprocal values of noise using an index of 100 representing a value of Ref.1. The smaller the value, the better the performance is.

Wear Resistance Test:

After traveling a certain distance on a dry road, an amount of wear on shoulder blocks was measured on each tire. The results are shown as respective reciprocal values of the amount of wear using an index of 100 representing a value of Ref.1. The larger the value, the better the performance is.

Test results are shown in Table 1.

TABLE 1

|  | Ref .1 | Ex. 1 | Ex. 2 | Ex. 3 | Ex. 4 | Ex. 5 | Ex. 6 |
|---|---|---|---|---|---|---|---|
| Tread pattern | FIG. 9 | FIG. 1 | FIG. 1 | FIG. 1 | FIG. 1 | FIG. 1 | FIG. 1 |
| Ratio W1/TW of shoulder main groove width to tread width (%) | 4.0 | 3.8 | 3.8 | 3.8 | 3.8 | 3.8 | 3.8 |
| Ratio L1/TWh | 0.63 | 0.45 | 0.40 | 0.50 | 0.55 | 0.60 | 0.45 |
| Ratio L3/L2 | — | 0.55 | 0.55 | 0.55 | 0.55 | 0.55 | 0.45 |
| Angle of inner portion of second shoulder lateral groove θ5 (deg.) | — | 9.0 | 9.0 | 9.0 | 9.0 | 9.0 | 9.0 |
| Angle of outer portion of second shoulder lateral groove θ6 (deg.) | — | 2.0 | 2.0 | 2.0 | 2.0 | 2.0 | 2.0 |
| Angle difference θ5-θ6 (deg.) | — | 7.0 | 7.0 | 7.0 | 7.0 | 7.0 | 7.0 |
| On-snow performance (Score) | 100 | 113 | 108 | 111 | 119 | 117 | 109 |
| Noise performance (Index) | 100 | 105 | 103 | 104 | 105 | 106 | 106 |
| Wear resistance performance (Index) | 100 | 100 | 99 | 100 | 100 | 101 | 102 |

|  | Ex. 7 | Ex. 8 | Ex. 9 | Ex. 10 | Ex. 11 | Ex. 12 | Ex. 13 |
|---|---|---|---|---|---|---|---|
| Tread pattern | FIG. 1 | FIG. 1 | FIG. 1 | FIG. 1 | FIG. 1 | FIG. 1 | FIG. 1 |
| Ratio W1/TW of shoulder main groove width to tread width (%) | 3.8 | 3.8 | 3.8 | 3.8 | 3.8 | 3.8 | 3.8 |
| Ratio L1/TWh | 0.45 | 0.45 | 0.45 | 0.45 | 0.45 | 0.45 | 0.45 |
| Ratio L3/L2 | 0.50 | 0.60 | 0.65 | 0.55 | 0.55 | 0.55 | 0.55 |
| Angle of inner portion of second shoulder lateral groove θ5 (deg.) | 9.0 | 9.0 | 9.0 | 5.0 | 10.0 | 15.0 | 15.0 |
| Angle of outer portion of second shoulder lateral groove θ6 (deg.) | 2.0 | 2.0 | 2.0 | 5.0 | 5.0 | 5.0 | 0 |
| Angle difference θ5-θ6 (deg.) | 7.0 | 7.0 | 7.0 | 0 | 5.0 | 10.0 | 15.0 |
| On-snow performance (Score) | 111 | 113 | 113 | 110 | 112 | 111 | 109 |
| Noise performance (Index) | 105 | 104 | 103 | 100 | 105 | 105 | 106 |
| Wear resistance performance (Index) | 100 | 98 | 97 | 102 | 101 | 97 | 95 |

|  | Ex. 14 | Ex. 15 | Ex. 16 | Ex. 17 | Ex. 18 | Ex. 19 | Ex. 20 |
|---|---|---|---|---|---|---|---|
| Tread pattern | FIG. 1 | FIG. 1 | FIG. 1 | FIG. 1 | FIG. 1 | FIG. 7 | FIG. 8 |
| Ratio W1/TW of shoulder main groove width to tread width (%) | 3.8 | 3.8 | 3.8 | 3.8 | 3.8 | 6.0 | 3.5 |
| Ratio L1/TWh | 0.45 | 0.45 | 0.45 | 0.50 | 0.50 | 0.40 | 0.43 |
| Ratio L3/L2 | 0.55 | 0.55 | 0.55 | 0.55 | 0.60 | 0.55 | — |
| Angle of inner portion of second shoulder lateral groove θ5 (deg.) | 7.0 | 12.0 | 15.0 | 15.0 | 15.0 | 5.0 | — |
| Angle of outer portion of second shoulder lateral groove θ6 (deg.) | 0 | 5.0 | 5.0 | 5.0 | 5.0 | 2.0 | — |
| Angle difference θ5-θ6 (deg.) | 7.0 | 7.0 | 10.0 | 10.0 | 10.0 | 3.0 | — |
| On-snow performance (Score) | 113 | 111 | 108 | 106 | 108 | 115 | 111 |
| Noise performance (Index) | 105 | 106 | 107 | 107 | 105 | 102 | 103 |
| Wear resistance performance (Index) | 100 | 97 | 98 | 98 | 99 | 99 | 102 |

From the test results, it is confirmed that the tires in accordance with the present embodiment exhibit in excellent on-snow performance while ensuring noise performance and wear resistance performance.

What is claimed is:

1. A pneumatic tire comprising:
a tread portion provided with a pair of circumferentially and continuously extending zigzag shoulder main grooves located adjacent to respective tread edges, a shoulder lateral groove extending axially outwardly from one of the shoulder main grooves and a central lateral groove connecting the shoulder main grooves;
said one of the shoulder main grooves comprising an inner corner portion protruding axially inwardly;
the central lateral groove comprising a first groove portion, a second groove portion and a confluence portion at which the first groove portion and the second groove portion meet;
the confluence portion of the central lateral groove being communicated with the inner corner portion of said one of the shoulder main grooves; and
the shoulder lateral groove being located so that an extended portion in which the shoulder lateral groove is extended axially inwardly overlaps with the confluence portion at least partially, wherein
said one of the shoulder main grooves comprises an axially outer groove edge comprising an inner corner protruding axially inwardly,
the shoulder lateral groove communicates with said one of the shoulder main grooves at a location excluding the inner corner,
the shoulder lateral groove includes an inner portion extending from one of the shoulder main grooves and an outer portion extending from the inner portion and having a width larger than that of the inner portion, wherein the inner portion has an angle with respect to an axial direction of the tire different from that of the outer portion, and
the difference in angles between the inner portion and the outer portion is in a range of from 5 to 10 degrees.

2. A pneumatic tire comprising:
a tread portion provided with a pair of circumferentially and continuously extending zigzag shoulder main grooves located adjacent to respective tread edges, a shoulder lateral groove extending axially outwardly from one of the shoulder main grooves and a central lateral groove connecting the shoulder main grooves;
said one of the shoulder main grooves comprising an inner corner portion protruding axially inwardly;
the central lateral groove comprising a first groove portion, a second groove portion and a confluence portion at which the first groove portion and the second groove portion meet;
the confluence portion of the central lateral groove being communicated with the inner corner portion of said one of the shoulder main grooves; and
the shoulder lateral groove being located so that an extended portion in which the shoulder lateral groove is extended axially inwardly overlaps with the confluence portion at least partially, wherein
the confluence portion has a groove width in a circumferential direction of the tire, and
the extended portion overlaps with the confluence portion in a width not more than half of the width of the confluence portion,
said one of the shoulder main grooves comprises an axially outer groove edge comprising an inner corner protruding axially inwardly,
the shoulder lateral groove communicates with said one of the shoulder main grooves at a location excluding the inner corner,
the shoulder lateral groove includes an inner portion extending from one of the shoulder main grooves and an outer portion extending from the inner portion and having a width larger than that of the inner portion, wherein the inner portion has an angle with respect to an axial direction of the tire different from that of the outer portion, and
the difference in angles between the inner portion and the outer portion is in a range of from 5 to 10 degrees.

3. The pneumatic tire according to claim 2, wherein an axial distance from a tire equator to a center line of each of the shoulder main grooves is in a range of from 0.4 to 0.6 times a tread half width which is an axial distance from the tire equator to one of the tread edges.

* * * * *